April 1, 1958 R. V. HUGHES 2,828,819
OIL PRODUCTION METHOD
Filed Aug. 29, 1955 2 Sheets-Sheet 1

INVENTOR.
Richard V. Hughes.
BY
ATTORNEY:

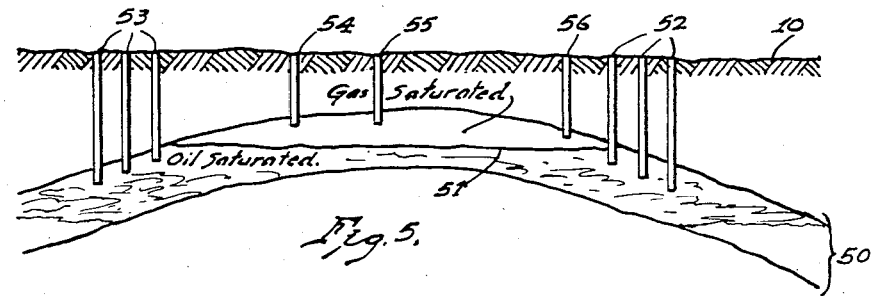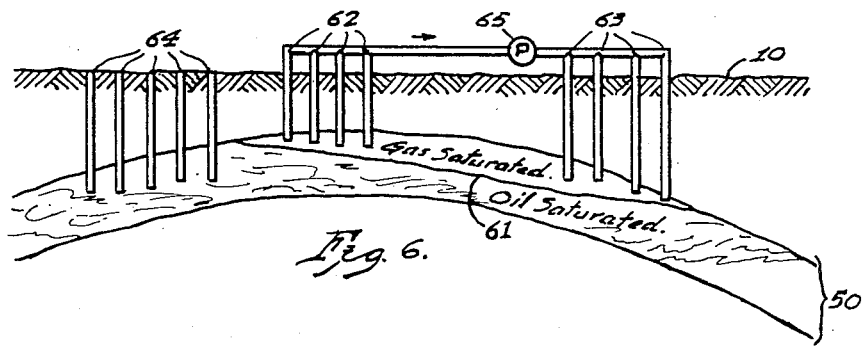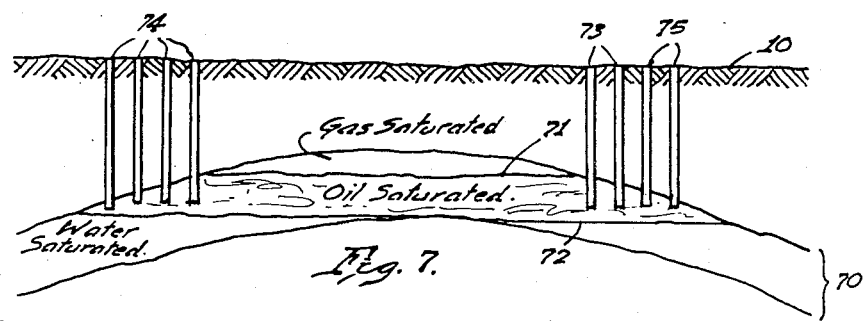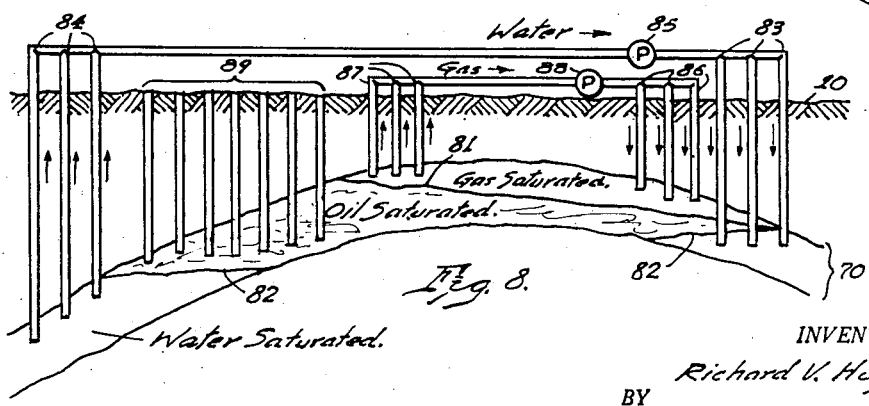

United States Patent Office 2,828,819
Patented Apr. 1, 1958

2,828,819

OIL PRODUCTION METHOD

Richard V. Hughes, Houston, Tex., assignor to Gulf Oil Corporation, Pittsburgh, Pa., a corporation of Pennsylvania Application August 29, 1955, Serial No. 530,973

8 Claims. (Cl. 166—9)

This invention relates to a method of producing oil from an underground petroleum reservoir, and in particular concerns an oil-production method in which desirable underground migration of the oil is generated so as to permit producing the oil at particular advantageously-located wells.

In the exploration and discovery of oil fields it often happens that a petroleum deposit is discovered which underlies a region which for one reason or another is not entirely accessible for drilling operations. Thus for example an oil field may be found to lie beneath a navigable body of water such as a river or harbor, or the central part of the oil field may be in mountainous terrain or may be occupied by a city or other structures such as buildings, dams, etc. The effect of these various impediments to drilling is to either make the drilling prohibitively expensive or well-nigh impossible. On the other hand, the edges of the oil field are often accessible and it is occasionally through such edge wells that the field is originally discovered. Directional drilling is expensive and is capable of only limited lateral displacement. My invention provides a method by which the oil underlying an inaccessible surface region may be displaced within reservoir sands so that the oil may be produced from accessible parts of the oil field.

My invention may also be applied in cases where it is desired to shift the limits or edges of an oil field in order to utilize parts of a reservoir more favorable to oil production on account of reservoir characteristics or other reasons. Thus for example by means of my invention one may increase the oil production from a highly permeable part of the reservoir by shifting the limits of the oil field toward the more permeable region. My invention may be applied to oil fields which are either under active and inactive water drives, or gas drive or both, in the manners described herein.

A further application of my invention arises in the case of a field with a relatively large gas-cap and having a relatively thin continuous oil ring. In such a field the wells which are drilled for oil production may miss the pay zone entirely or may find the pay zone too thin to produce without excessively high gas-oil or water-oil ratios. My invention provides a method of thickening the oil-saturated pay zone at one side of the ring so that the oil may be efficiently produced therefrom at this side of the ring.

My invention may be understood by reference to the drawings forming part of this specification, and in which Figure 1 shows a diagrammatical cross section of an oil field whose central portion underlies an inaccessible region in which wells cannot be drilled;

Figure 5 shows a diagrammatical cross section of an oil field having a large gas cap but whose reservoir may have less favorable permeability at one side;

Figure 6 illustrates how my invention may be applied to shift the production of the field of Figure 5 to a more advantageous region;

Figure 7 shows a diagrammatical cross section of an oil field with gas cap and also having underlying water; and Figure 8 illustrates how my invention may be applied to increase the production from desirable wells of Figure 7.

In one embodiment, my invention comprises utilizing existing edge wells, or new wells if necessary, for the introduction of water and at the same time utilizing substantially diametrically opposite edge wells or such additional wells as may be necessary to withdraw water. The water is injected and withdrawn below the oil-water interface and thereby effects a pressure gradient and a resultant flow of water in the water-bearing stratum from the injection wells to the water-removal wells. In this manner my invention effects a tilting of the oil-water contact, the oil-water contact being highest in that portion of the field near the water-injection wells and lower in that portion of the field near the water-removal wells. As a result of the tilt of the oil-water contact it is found that the oil body will migrate toward the side of the field from which water is being removed, thus moving the oil body from under the central inaccessible region to one side of the oil field where it is accessible to oil production wells.

In another embodiment, my invention employs injection and withdrawal of gas above the gas-oil contact in gas-cap fields thereby effecting a tilting of the gas-oil contact to cause migration of the oil body as more fully explained below.

Figure 1:
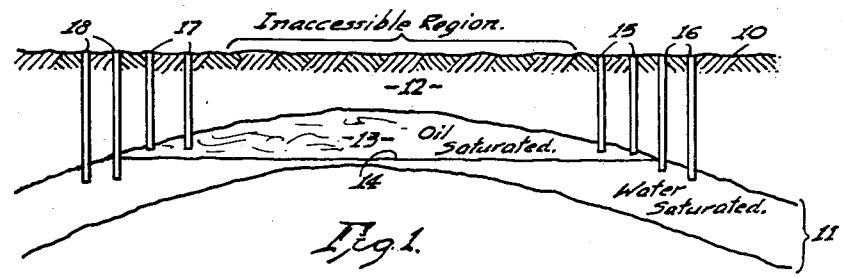

Referring to Figure 1 there is shown a diagrammatical cross section, not to scale, of a typical oil field. The surface of the earth is indicated at 10 and the reservoir rock formation at 11. It is assumed that in the sediments 12 between the surface 10 and the reservoir rock 11 there is an impervious member contiguous to the upper surface of 11 which has trapped the oil in the region 13. Commonly an oil-water contact 14 occurs, with either edge-water or bottom water in the formation 11 below the oil-water contact 14. The field may have been originally discovered by the drilling of wells 15 which produced a small amount of oil from the edge of the field, the edge of the field being delineated by wells 16 which produce only water. The region immediately to the left of wells 15 is inaccessible for one reason or another as previously mentioned. At the opposite side of the field the wells 17 may again produce oil near the edge of the field, whereas wells 18 are "dry" and produce only salt water. It is apparent that with normal production methods the wells 15 and 17 will soon be subjected to water encroachment and will cease to be profitable, whereas large quantities of oil would still remain under the inacessible region at the center of the oil field shown in Figure 1 prior to application of my invention.

Figure 2:
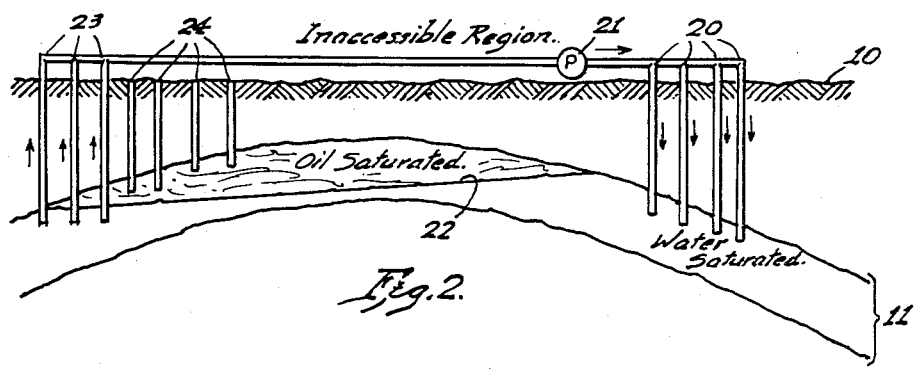
Figure 2 illustrates the application of my invention to an oil field such as that shown in Figure 1.

The application of my invention is shown in Figure 2. The wells 15, 16 of Figure 1 are utilized in Figure 2 as water-injection wells 20 and additional water-injection wells may be drilled as necessary. All of these wells enter the reservoir rock 11 and are completed so as to deliver water thereto at a level below the oil-water contact 22. Additional wells such as 23 may be drilled at the opposite side of the oil field beyond the wells 17 and 18 of Figure 1, and these wells also penetrate the reservoir rock 11 and are completed at a depth below the oil-water contact 22. The wells 23 are flowed or pumped at a desired rate from below the oil-water contact and the salt water produced from them may, if desired, be injected by pump 21 into the water-injection wells 20. The effect of injecting the produced or other water at the right hand side of the field and withdrawing it at the opposite side of the field is to set up a pressure gradient and resultant flow of water below the oil-water contact in the reservoir rock 11 from right to left.

It is to be particularly noted that this flow of water is in the water-bearing part of the reservoir rock 11. The induced flow and formation of a pressure gradient from right to left are manifested as a tilt of the upper water interface, namely, the oil-water contact 22 of Figure 2. The effect of this tilting of the oil-water contact 22 is to thicken the oil-producing part of the reservoir underlying the wells 17 and 18 of Figure 1 and other added oil wells as designated in Figure 2 as 24. It is apparent that in Figure 2 wells 24 may now withdraw oil from a thicker section of the reservoir rock 11 than before. Furthermore, as the oil is withdrawn and the oil-water contact slowly rises and moves toward the left through the productive life of the field, it becomes possible to withdraw substantially all of the oil from under the inaccessible central areas. It is also seen that the augmented oil production from the wells 24 occurs at the expense of production from old wells 15 (Figure 1) at the opposite side of the field, but the loss in oil production from edge wells 15 is very substantially more than offset by the increase in oil production and long productive life of wells 24 of Figure 2, the wells 24 comprising old wells (17 of Figure 1), new production from old wells 18 and production from new wells. Furthermore, the water-injection wells 20 serve as means of disposing of salt water withdrawn from the wells 23 or as a means of injecting other waters. It is thus seen that my invention permits the withdrawal of virtually all the producible oil from under an inaccessible area by effecting migration of the oil to an accessible side of the oil field. The rapidity with which such migration may be accomplished depends chiefly upon the permeability of the reservoir rock 11, the distances involved, the relative rates of oil and water production, and the rate of water injection. The time required may be computed by well known methods if desired, but inasmuch as only a small movement of the reservoir fluids as a whole is entailed it is readily seen that this can easily take place during the course of the productive life of the oil field.

Figure 3:
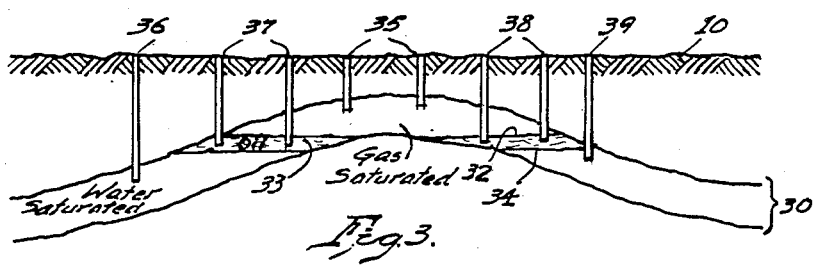
Figure 3 shows a diagrammatical cross section of an oil field having a large gas cap and thin oil ring.

Figure 3 shows a diagrammatical cross section, not to scale, of a typical oil field having a relatively large gas cap and a relatively thin oil-saturated zone 33. The gas-oil contact is shown at 32 as a substantially level surface. The oil saturated zone is underlain by water saturation with a substantially level oil-water contact 34. Upon drilling such a field as shown in Figure 3 the wells 35 may produce gas whereas wells 36 and 39 may be "dry" and produce only salt water. Wells 37 and 38 may produce oil, but due to the very thin vertical extent of the oil ring 33 there will be low oil recoveries due to early water coning and/or gas cutting of the oil which results in high water-oil or gas-oil ratios with attending problems of separation and disposition of the large quantities of water and/or gas. Figure 3 shows the oil field prior to application of my invention.

Figure 4:
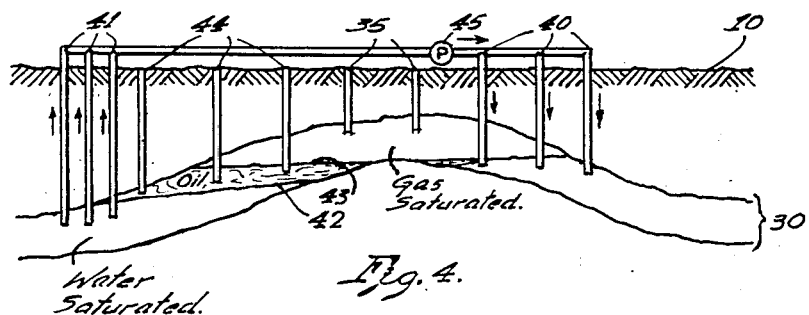
Figure 4 illustrates how my invention may be applied to efficiently produce the oil field of Figure 3.

Figure 4 shows how my invention may be applied to an oil field of the type shown in Figure 3. The wells 35 may continue to produce gas from the gas cap at rates insufficient to cause substantial loss of reservoir pressure. However, wells 40 comprising old wells 38 and 39 of Figure 3, plus additional wells as required, are converted to water-injection wells through which water is injected into the reservoir rock 30 at a depth below the oil-water contact 42. On the opposite side of the field additional wells 41 are drilled into the reservoir rock 30 also to below the level of the oil-water contact and water is withdrawn through these wells from below the oil-water contact either by flowing or by artificial means at a desired rate. The effect of the water flow thus set up in the water-saturated part of the reservoir rock 30 from the injection wells 40 to the withdrawal wells 41 causes a tilting of the oil-water contact 42 from the water-input wells downward to the water-withdrawal wells. The gas oil contact 43 may remain substantially level. The effect of the tilt in the oil-water contact is to thicken the oil-productive zone of the wells 44 permitting the withdrawal of oil from these wells at a high but efficient rate. The tilting of the oil ring as shown in Figure 4 permits a high overall oil recovery at low gas-oil or low water-oil ratios from a relatively few wells. As suggested in connection with Figure 2 the water removed from wells 41 may conveniently be returned by pump 45 to the wells 40 at the opposite side of the field or other waters may be injected through wells 40. It is thus seen that the application of my invention permits the efficient withdrawal of oil from the reservoir without the production of commingled gas or water. Furthermore, since there are often lateral variations in permeability of the producing horizon 30 it is possible by the application of my invention to tilt the oil ring into the azimuthal direction of the most favorable permeability relationships whereby the oil may still more efficiently enter the producing wells 44.

My invention is not to be confused with the well-known water-flooding process in which water is forced through the oil bearing interstices of the reservoir rock to flood or flush out the oil previously located therein. Nor should it be confused with the well-known water-imbibition process of water flooding. In my invention the water flows substantially entirely through channels of the reservoir rock previously already occupied by water. This means that the water flow does not have to overcome such factors as interfacial tensions nor does the flowing water have to displace oil through small capillaries to any substantial extent. The flow of water does not in any sense push ahead of it or flood out the oil from the pores of the reservoir rock as is the case in water flooding. The lower the gravity of the oil the lower the efficiency of the well-known methods of water flooding. In my invention the lower the gravity of the oil the more effective the displacement process. The flow of water alters the hydraulic pressure gradients in the formation so that the oil-water contact slowly assumes a new and tilted position which in turn makes the oil available at the desired wells.

Figure 5 shows a diagrammatical cross section, not to scale, of an oil field having a gas cap whose oil ring is relatively thick, vertically, whose edge contact with water is relatively far away or substantially non-existent. The reservoir rock 50 is gas saturated in the gas cap and oil saturated below the gas-oil contact 51. Wells 52 on the right-hand side of the field produce oil as also do wells 53 on the other side of the field. Wells 54, 55 and 56 may be producing free gas from the gas cap. It will be assumed that for one reason or another the wells 52 completed in formation 50 on this side of the oil field are commercially unprofitable, possibly due to unfavorable permeability of the formation 50 on this side of the oil field, excessive plugging of the sand, etc. and that it is desired to further develop and augment production from the opposite side of the field. Figure 5 shows the field prior to application of my invention.

Figure 6 shows how my invention is applied to the oil field of Figure 5. The wells 52 and 56 are converted to gas-injection wells 63, while wells 54 and 55 are used to withdraw gas at a desired rate with such additional wells being drilled as are necessary for this purpose as shown at 62. The wells 63 are completed in the gas cap and deliver gas above the gas-oil contact 61, whereas wells 62 are also completed in the gas cap and withdraw gas above the gas-oil contact. Gas withdrawn from wells 62 is injected into wells 63 by means of compressor 65. As a result of the pressure gradient and flow of gas in the gas-saturated part of the reservoir rock, the gas-oil contact 61 is tilted, being higher at the gas-withdrawal side of the field. Accordingly, old wells 53 plus newly-drilled wells all of which are shown in Figure 6 as wells 64 will produce oil. The wells 64 are chosen as those most favorable to oil production for reasons of favorable reservoir characteristics. Inasmuch as the oil-saturated part of the reservoir has been materially thickened in the vicinity of these wells their production will increase and more than offset the loss of production of old wells 52 (Figure 5).

It is to be noted that in my invention the gas flow takes place in the gas-saturated part of the reservoir rock and is therefore not to be confused with the well-known gas drive process or gas recycling as used for pressure maintenance and other well known secondary recovery operations in which cases the gas is injected and/or circulated in the oil-producing part of the reservoir so as to dissolve in and/or sweep out the oil. In my invention the gas flow is in the gas-saturated part of the reservoir and sets up a pressure gradient which slowly tilts the gas-oil contact and thereby causes the respective gas and oil bodies to slowly migrate into a new position which is more advantageous for oil production. The fact that the gas flow is through the gas-saturated part of the formation means that the flow meets less resistance than it would if injected into the oil-saturated zone as is done in conventional gas-drive and gas cycling operations to flush the oil from its pores.

Figure 7 shows a diagrammatical cross section of a typical oil field having both a gas cap and edge water drive. The reservoir formation 70 is gas saturated at the uppermost zone of the trap and a gas-oil contact 71 exists where the gas saturation meets the oil saturation. At the bottom of the oil saturation there is an oil-water contact 72 below which the formation is saturated with salt water. Figure 7 shows the original state of the oil field prior to the application of my invention. There may be wells 73 and 75 at one side of the field and other wells 74 at the other side of the field all of which produce some oil. Additional wells (not shown) intermediate wells 73 and 74 may produce gas from the gas cap or oil from below the gas-oil contact 71. It is assumed that for reasons of inferior productivity or some other reason, it is desired to abandon production from wells 73 and 75 and instead further develop the opposite side of the field near wells 74.

Figure 8 shows how my invention is applied to the oil field of Figure 7. The old wells 75 plus additional wells as required are deepened to form wells 83 of Figure 8 which are completed below the oil-water contact 82. Water is injected into the wells 83 at a desired rate. Wells 84 are drilled at the opposite side of the field to below the oil-water contact and water is withdrawn from below the oil-water contact through wells 84. This water may be reinjected into wells 83 by means of pump 85. The effect of the water flow in the water saturated part of the formation is to effect a tilting of the oil-water contact 82 downward toward the wells 84 as shown in Figure 8. This produces a downward thickening of the oil-saturated part of the reservoir at the left-hand side of Figure 8.

According to my invention, still further thickening of the oil saturation is effected by converting the wells 73 of Figure 7 to gas input wells 86 (including also additional wells if required) which penetrate into the gas saturation and are completed so that they may inject gas into the gas cap at the right-hand side of the field. Wells 87 which may be existing wells or new wells are completed in the gas cap near the left-hand side of the field. Gas is withdrawn at a desired rate from above the gas-oil contact 81 through wells 87 and injected into wells 86 above the gas-oil contact by means of compressor 88. The flow of gas through the gas-saturated part of the reservoir from wells 86 to wells 87 causes a tilting of the gas-oil contact upward toward the gas-withdrawal wells 87. This produces an upward thickening of the oil zone at the left-hand side of Figure 8.

The result of the thickening of the oil zone as effected by my invention is to make very prolific wells out of the old wells 74 of Figure 7 plus those additional wells drilled in the thickened oil zone as illustrated by wells 89 of Figure 8. The added production obtained far more than offsets the loss of production from the wells 73 and 75 of Figure 7, and the production of free gas and water in the oil stream is eliminated. Displacement of the oil within the reservoir as effected by my invention may be in the direction of the highest productivity wells so that the field is most efficiently produced.

It is evident in Figure 8 that certain of the injection wells 83 and 86 may be combined so that one well will serve a dual purpose. Thus, for example, the left-hand one of the wells 83 and the right-hand one of the wells 86 may be combined into a single well which is completed as a dual completion, one of the completions being in the water-saturated part of the formation below the oil-water contact, and the other completion being in the gas-saturated part of the formation above the gas-oil contact. By such dual completions the required total number of wells may be reduced in the several embodiments of my invention. In the appended claims, however, the term well is to be construed as one flow channel, so that such a dual completion is for purposes of this invention equivalent to two wells serving the same or different purposes.

My invention, described above as it is applied to an entire oil field, may also be applied to a portion of a field or to a particular lease. By employing my invention the fluid interfaces under a portion of a field or under a particular lease may be tilted as desired. For example, the oil-water contact under a particular lease may be tilted by drilling water-injection wells along one side of the lease and water-producing wells and also oil wells at the opposite side of the lease, the water-injection wells and the water-producing wells being completed below the oil-water contact, and the oil wells being completed above the oil-water contact. Location of the respective wells on the lease may be designed to take optimum advantage of variations in permeability over the lease area. Furthermore, warping of the oil-water contact by tilting it about two axes may be accomplished under a particular lease by drilling a water-injection well at selected corners of the lease and drilling a water-producing well and an oil-producing well in the center or at other locations on the lease, the water-injection wells and the water-producing wells being completed below the oil-water contact and the oil well being completed above the oil-water contact. Other spatial or pattern arrangements will become evident to those skilled in the art and such areal distributions of injection and producing wells are within the purview of my invention. In the appended claims the term oil field is to be construed as including an entire oil field or any desired portion thereof.

Whereas my invention has been described as applied to oil fields containing gas, oil and water, my invention can also be advantageously applied when the reservoir contains any two fluids of different densities which are segregated in the reservoir by gravity. For example, the invention may be applied to more advantageously recover condensate in a gas-cycling operation or oil in a secondary-recovery operation. In various secondary-recovery operations extraneous fluids are sometimes injected into the reservoir and my invention will be advantageous in all cases where gravity segregation of the reservoir fluids occurs, whether such fluids are the original reservoir fluids or subsequently artificially introduced fluids.

What I claim as my invention is:

1. A method of extracting fluids from an underground reservoir in which the fluids are segregated by gravity to form an interfluid contact surface which comprises withdrawing one of the contacting fluids at a first location, injecting the same fluid at a second location and into the same body of fluid as that from which it was withdrawn spaced from said first location whereby the interfluid contact surface between said locations is tilted from its original aspect, and withdrawing the other contacting fluid at a location proximate the first location.

2. A method of extracting oil from an underground oil field having a reservoir rock with a contact surface between the oil and a second fluid segregated from the oil by gravity which comprises withdrawing the contacting second fluid at a first location, injecting the second fluid at a second location spaced from said first location and into the same body of fluid as that from which it was withdrawn whereby the contact surface between said locations is tilted, and withdrawing oil at a location proximate the first location.

3. A method of extracting oil from an underground oil field having a reservoir rock with an oil-water contact surface which comprises withdrawing contacting water from below the oil-water contact at a first location, injecting water into the same reservoir rock below the oil-water contact at a second location spaced from said first location whereby the oil-water contact surface between said locations is tilted, and withdrawing oil from the same reservoir rock above the oil-water contact at a location proximate the first location.

4. A method of extracting oil from an underground oil field having a reservoir rock with an oil-water contact surface which comprises providing at least three wells which penetrate the reservoir rock, the first of said wells communicating with the reservoir rock above the oil-water contact and the second and third of said wells communicating with the same reservoir rock below the oil-water contact, the first and second of said wells being in proximity, withdrawing water from the reservoir rock through the second of said wells from below the oil-water contact, injecting water into the reservoir rock through the third of said wells below the oil-water contact, and withdrawing oil through the first of said wells from above the oil-water contact.

5. A method of extracting oil from an underground oil field having a reservoir rock with a free gas-oil contact surface which comprises withdrawing gas from the reservoir rock above the gas-oil contact at a first location, injecting gas into the same reservoir rock above the gas-oil contact at a second location spaced from said first location whereby the gas-oil contact surface between said locations is tilted, and withdrawing oil from the same reservoir rock below the gas-oil contact at a location proximate the first location.

6. A method of extracting oil from an underground oil field having a reservoir rock with a free gas-oil contact surface which comprises providing at least three wells which penetrate the reservoir rock, the first of said wells communicating with the reservoir rock below the gas-oil contact and the second and third of said wells communicating with the same reservoir rock above the gas-oil contact, the first and second of said wells being in proximity, withdrawing gas from the reservoir rock through the second of said wells from above the gas-oil contact, injecting gas into the reservoir rock through the third of said wells above the gas-oil contact, and withdrawing oil through the first of said wells from below the gas-oil contact.

7. A method of extracting oil from an underground oil field having a reservoir rock with a free gas-oil contact surface and an oil-water contact surface which comprises withdrawing gas from the reservoir rock above the gas-oil contact at a first location, injecting gas into the same reservoir rock above the gas-oil contact at a second location spaced from the first location whereby the gas-oil contact surface between said locations is tilted, withdrawing water from the same reservoir rock below the oil-water contact at a location proximate said first location, injecting water into the same reservoir rock below the oil-water contact at a location spaced from said first location whereby the oil-water contact surface is tilted, and withdrawing oil from the same reservoir rock from a depth intermediate the gas-oil contact and the oil-water contact at a location proximate said first location.

8. A method of extracting oil from an underground oil field having a reservoir rock with a free gas-oil contact and an oil-water contact which comprises providing at least five wells which penetrate the same reservoir rock, the first of said wells communicating with the reservoir rock intermediate the gas-oil and the oil-water contact, the second and third of said wells communicating with the reservoir rock above the gas-oil contact, the fourth and fifth of said wells communicating with the reservoir rock below the oil-water contact, the first, second and fourth of said wells being in proximity and the third and fifth of said wells being in proximity, withdrawing gas from the reservoir rock through the second of said wells from above the gas-oil contact, injecting gas into the reservoir rock through the third of said wells above the gas-oil contact, withdrawing water from the reservoir rock through the fourth of said wells from below the oil-water contact, injecting water into the reservoir rock through the fifth of said wells below the oil-water contact, and withdrawing oil from the reservoir rock through the first of said wells from intermediate the gas-oil contact and the oil-water contact.

References Cited in the file of this patent

UNITED STATES PATENTS

| | | |
|---|---|---|
| 1,885,807 | Doherty | Nov. 1, 1932 |
| 2,230,001 | McConnell et al. | Jan. 28, 1941 |

OTHER REFERENCES

Uren Petroleum Production Engineering (Exploitation), McGraw-Hill, 1939, page 459.